(12) United States Patent
Boyce (10) Patent No.: US 12,134,282 B2
(45) Date of Patent: Nov. 5, 2024

(54) COMBINED LID AND STRAINER DEVICE FOR A PAINT CONTAINER

(71) Applicant: David James Boyce, Calgary (CA)

(72) Inventor: David James Boyce, Calgary (CA)

( * ) Notice: Subject to any disclaimer, the term of this patent is extended or adjusted under 35 U.S.C. 154(b) by 169 days.

(21) Appl. No.: 17/886,583

(22) Filed: Aug. 12, 2022

(65) Prior Publication Data
US 2023/0110407 A1 Apr. 13, 2023

Related U.S. Application Data

(63) Continuation-in-part of application No. 17/487,573, filed on Sep. 28, 2021, now Pat. No. 11,446,956.

(51) Int. Cl.
| | |
|---|---|
| *B44D 3/12* | (2006.01) |
| *B01D 29/05* | (2006.01) |
| *B01D 35/28* | (2006.01) |
| *B01F 31/60* | (2022.01) |
| *B65D 47/08* | (2006.01) |
| *B01F 101/30* | (2022.01) |

(52) U.S. Cl.
CPC ............. *B44D 3/127* (2013.01); *B01D 29/05* (2013.01); *B01D 35/28* (2013.01); *B01F 31/60* (2022.01); *B65D 47/08* (2013.01); *B01F 2101/30* (2022.01)

(58) Field of Classification Search
CPC ........ B44D 3/127; B01D 29/05; B01D 35/28; B01D 35/02; B01F 31/60; B01F 2101/30; B65D 47/08; B65D 2231/025; B65D 2251/0021; B65D 2251/0062; B65D 2251/0087; B65D 47/043; B65D 47/0838; B65D 47/0847; B65D 51/20
See application file for complete search history.

(56) References Cited

U.S. PATENT DOCUMENTS

| | | | | |
|---|---|---|---|---|
| 2,779,960 | A * | 2/1957 | Ogren .................... | B44D 3/126 220/570 |
| 6,102,235 | A * | 8/2000 | Stern ...................... | B44D 3/128 220/570 |
| 7,134,576 | B2 * | 11/2006 | Gringer .................. | B44D 3/127 222/153.07 |
| 9,102,193 | B1 * | 8/2015 | Mahowald ............. | B44D 3/127 |
| 9,669,654 | B1 * | 6/2017 | Wager .................... | B44D 3/128 |
| 10,493,794 | B1 * | 12/2019 | Ryan ...................... | B44D 3/128 |
| 11,667,147 | B2 * | 6/2023 | Archard ............. | B05C 17/0245 220/570 |

(Continued)

*Primary Examiner* — Kareen K Thomas
(74) *Attorney, Agent, or Firm* — Kyle R Satterthwate; Ryan W Dupuis; Ade & Company Inc.

(57) ABSTRACT

A combined lid and strainer device for a paint container features an outer mounting rim configured for mated fitting onto a rim of the paint container. Within a central circular area surrounded by the rim, there is a perforated a straining area through which paint is pourable. A movable cover is selectively movable between a closed position overlying the perforated straining area, and open positions withdrawn therefrom to allow strained pouring of the paint therethrough. Raised features on the cover are used to secure the cover closed when the lidded container is placed in a paint shaker. A sealing membrane is used, at least initially, seal the perforated area in air-tight fashion to maintain paint freshness. Securement features are usable to secure the flap in both closed and open positions.

6 Claims, 6 Drawing Sheets

(56) References Cited

U.S. PATENT DOCUMENTS

| | | | | |
|---|---|---|---|---|
| 2007/0295768 A1* | 12/2007 | Gringer | ............. | B65D 25/2829 |
| | | | | 222/570 |
| 2009/0159607 A1* | 6/2009 | Kratzer | ................ | B44D 3/128 |
| | | | | 220/849 |
| 2010/0089931 A1* | 4/2010 | Sheehy | ................ | B44D 3/123 |
| | | | | 15/257.06 |
| 2010/0089932 A1* | 4/2010 | Sheehy | ................ | B44D 3/123 |
| | | | | 222/573 |
| 2010/0116834 A1* | 5/2010 | Sulick, Jr. | ............. | B44D 3/127 |
| | | | | 220/700 |
| 2010/0230413 A1* | 9/2010 | Crudgington, Jr. | .... | B44D 3/128 |
| | | | | 220/733 |
| 2015/0001252 A1* | 1/2015 | Eberhardt | ............. | B44D 3/128 |
| | | | | 222/570 |
| 2015/0102034 A1* | 4/2015 | Hutt | ................ | B65D 43/0216 |
| | | | | 220/315 |
| 2015/0102045 A1* | 4/2015 | Nazlian | ................ | B44D 3/006 |
| | | | | 220/697 |

\* cited by examiner

COMBINED LID AND STRAINER DEVICE FOR A PAINT CONTAINER

CROSS-REFERENCE TO RELATED APPLICATIONS

This application is a continuation of prior Non-Provisional application Ser. No. 17/487,573, filed Sep. 28, 2021, the entirety of which is incorporated herein by reference.

FIELD OF THE INVENTION

This application relates generally to containers, and more particularly to lids and straining devices for paint containers.

BACKGROUND

In the field of paint products, there have numerous prior designs for paint straining products that attach to the rim of a paint can and provide a perforated screen or mesh-like strainer body through which paint can be poured form the can in manner removing impurities (clumps, dirt, dust, dried flakes, etc.) from the poured paint. Examples of such products can be seen in prior U.S. Pat. Nos. 1,959,584, 2,471,189, 2,606,694, 2,849,158, 3,081,912, 4,240,568, 5,078,872, USD254482 and USD846822. Despite these prior paint straining proposals, there remains room for an improved solution for optimally convenient straining of paint during poured dispensing thereof from a paint container.

SUMMARY OF THE INVENTION

According to one aspect of the invention, there is provided a combined lid and strainer device for a paint container, comprising:
  an outer mounting rim of downwardly-opening channel-shaped configuration for mated fitting over a top rim of the paint container, said outer mounting rim spanning around a central circular area;
  within said central circular area surrounded by the rim, a straining area having perforations therein that penetrate fully through said straining area from a topside thereof to an opposing underside thereof to enabling strained pouring of paint from the paint through said perforations; and
  a movable cover selectively movable between a closed position overlying the straining area at the topside thereof in fully obstructing relation to the perforations, and at least one open position withdrawn from the topside of the straining area to expose the perforations therein and allow said strained pouring of the paint therethrough.

By uniquely incorporating a paint strainer directly into a lid of the container, together with a movable cover that's closable over the perforated straining area, an inconvenience shared by the forgoing prior art solutions is avoided, particularly the need to remove the lid of the container, temporarily install a strainer on the container in place of the removed lid thereof, only to subsequently have to remove the strainer and reinstall the lid in order to store any remaining un-poured or un-used paint in properly enclosed fashion.

In one preferred embodiment, the device further comprises:
  an openable closeable port that is of separate and distinct relation to the perforations of the straining area, and is openable and closeable independently of opening and closing of the straining area by the movable cover; and
  a membrane overlying an entirety of the straining area in a position of underlying relation to the closed position of the cover, said membrane providing an airtight seal over the perforations to prevent drying of paint contents of the paint container.

According to another aspect of the invention, there is provided a method of preparing a tinted paint product using the device of said preferred embodiment, said method comprising:
  with a base paint situated inside a paint container on which the device is fitted at a top rim thereof, and with the movable cover secured in the closed position and the membrane intact over the straining area to provide said airtight seal over the perforations, opening the openable/closeable port of the device, and through the open port, introducing a tinting additive into the paint container, thereby adding said tinting additive to the base paint;
  reclosing the openable/closeable port; and
  with the movable cover and the openable/closeable port both closed, and with the membrane still intact over the straining area to maintain said airtight seal, agitating the paint container to thoroughly mix the base paint and the tinting additive together within the paint container and thereby achieve said tinted paint product, all while maintaining the perforations under the airtight seal of the membrane.

BRIEF DESCRIPTION OF THE DRAWINGS

Preferred embodiments of the invention will now be described in conjunction with the accompanying drawings in which.

DETAILED DESCRIPTION

Figure 1:
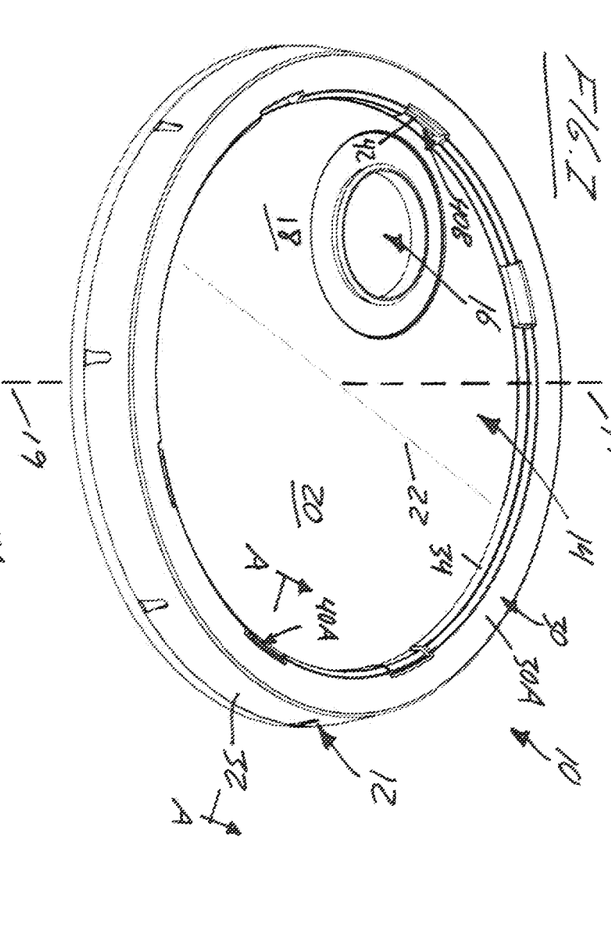
FIG. 1 is a top perspective view of a first embodiment of a combined lid and strainer for a paint container, with a movable partial cover flap thereof in a closed position.

Referring initially to FIG. 1, a first embodiment of a combined lid and strainer device 10 for a paint container is shown. When viewed from the top in the particular state shown in FIG. 1, the first embodiment visually resembles a conventional lid for a 5-gallon bucket of paint when the device, though the other figures reveal unique features and functionality lacking in such conventional lids. In conventional fashion, the combined lid and strainer device 10, also referred to herein as simply a "lid" for brevity, has a circular outer mounting rim 12 configured for mated fitting onto a top rim of a paint container, for example a stand 5-gallon paint bucket, though it will be appreciated that design aspects of the device 10 may incorporated into lids for other paint container types and sizes, for example including a 1-gallon paint can. The mounting rim 12 surrounds a circular inner area 14 of the lid 10. As shown, a circular port 16 penetrates vertically through the lid 10 at a horizontal and otherwise solid (unperforated) and stationary semi-circular wall 18 that resides in a plane normal to a central vertical axis 19 around which the mounting rim 12 is centered. This stationary semi-circular wall 18 is permanently affixed to the surrounding mounting rim.

It will be appreciated that the terms horizontal and vertical are being used in relation to a normal orientation in which the lid 10 would reside when installed in a horizontal plane on an upper rim of a paint can, pail or bucket. In a conventional 5-gallon lid, the port 16 is used to accommodate installation of a pour spout therein, but serves one or more other purposes in the present invention, as disclosed in more detail further below. The second semi-cylindrical half of the circular inner area 14, instead of being a stationarily-fixed wall 18, is a pivotally movable semi-circular cover flap 20 that's joined to the fixed wall 18 via a living hinge at a supported end of the cover flap 20. A hinge axis 22 of this living hinge lies diametrically of the rim 12 and denotes a boundary line between the semi-circular fixed wall 18 and the semi-circular cover flap 20. FIG. 1 shows the cover flap 20 residing in a closed position of coplanar relation to the fixed wall 18, and thus cooperating with the semi-circular fixed wall 18 to substantially fill an entirety of the circular inner area 14 delimited by the outer mounting rim 12.

Figure 2:
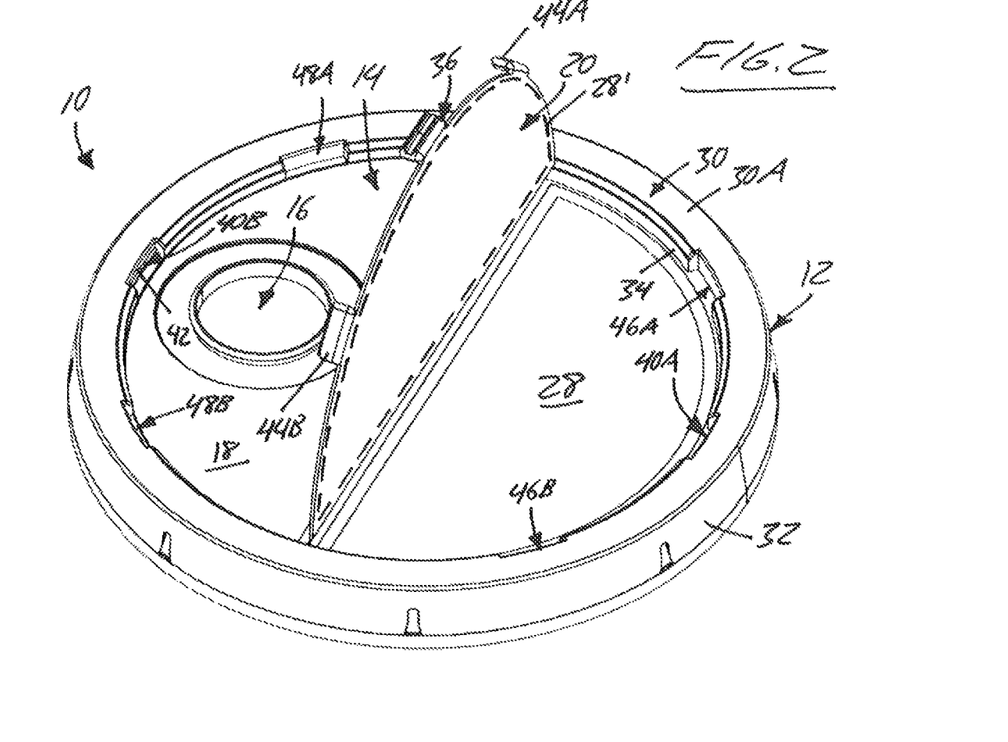
FIG. 2 is a top perspective view of the first embodiment with the movable partial cover flap thereof in a partially opened and unsecured position, and with a peel-off sealing membrane in an initial working position sealing off a topside of the strainer in air-tight fashion.
Figure 3:
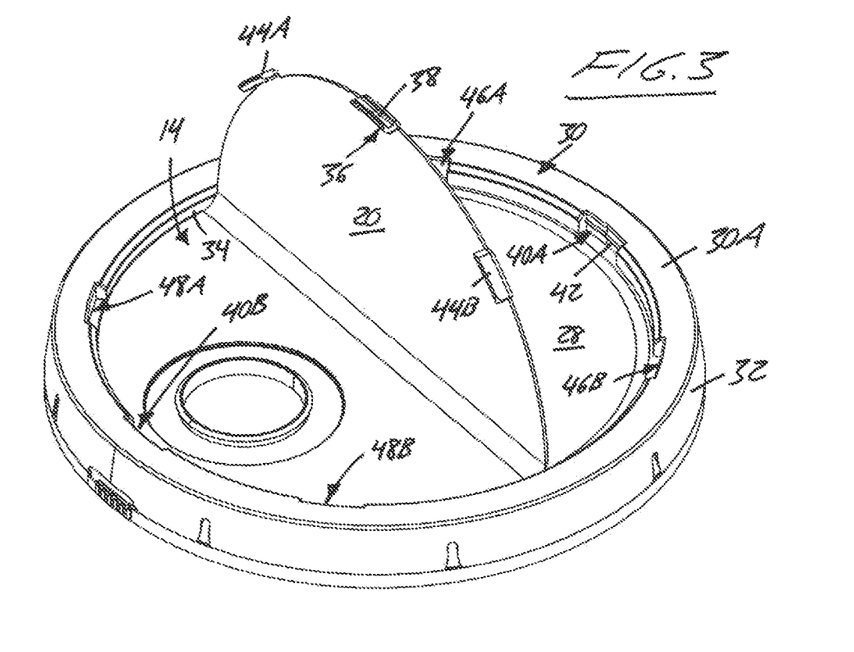
FIG. 3 is another top perspective view of the first embodiment, shown in the same position as FIG. 2, but from another angle.
Figure 4:
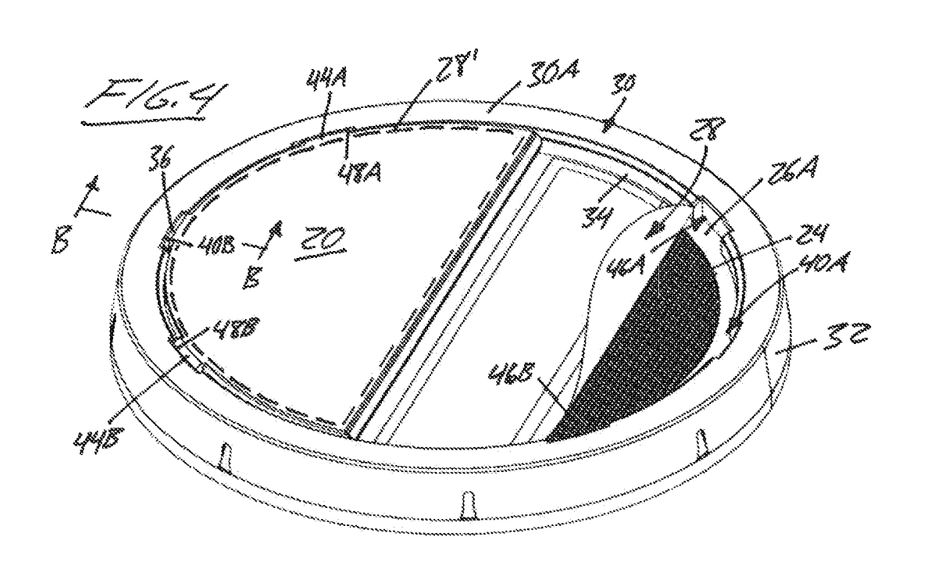
FIG. 4 is a top perspective view of the first embodiment with the movable partial cover flap thereof in a fully opened and secured position, and illustrating peeled removal of the peel-off sealing membrane to enable poured dispensing of paint through the strainer.
Figure 5:
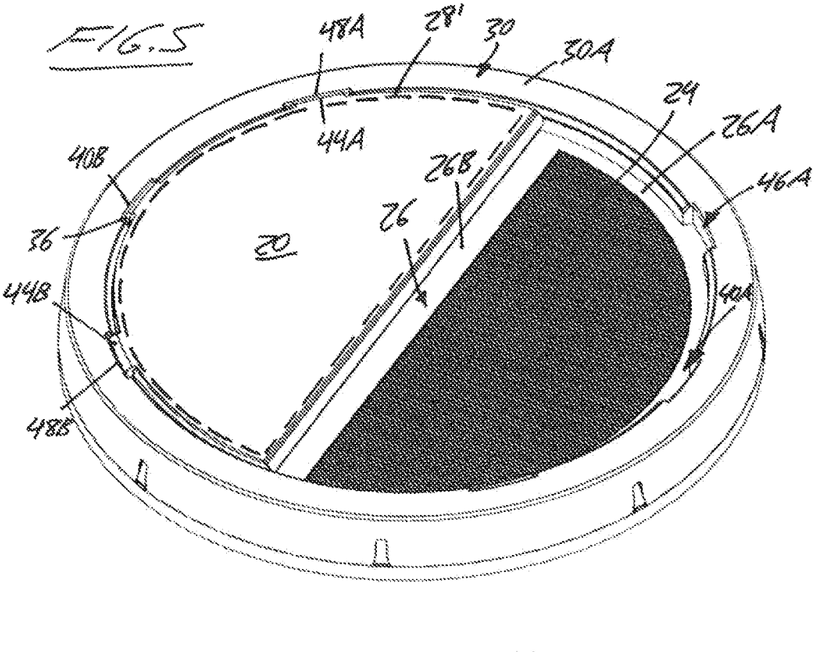
FIG. 5 is another top perspective view of the first embodiment with the movable partial cover flap in the same position as FIG. 5, but with the peel-off sealing membrane fully removed to expose an entirety of the strainer.
Figure 6:
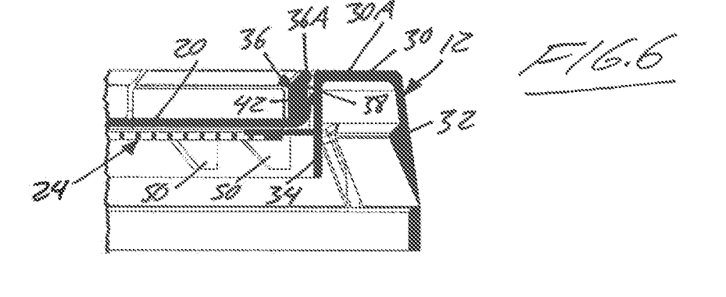
FIG. 6 is a partial cross-sectional view of the first embodiment as viewed along line A-A of FIG. 1.
Figure 7:
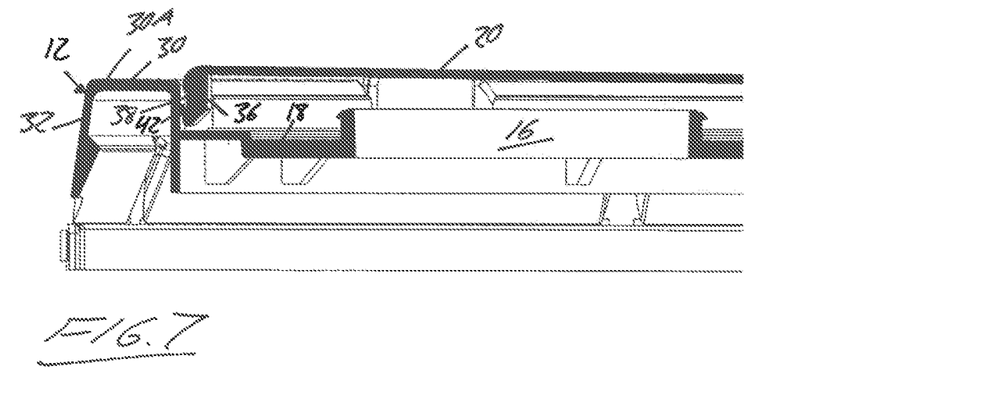
FIG. 7 is a partial cross-sectional view of the first embodiment as viewed along line B-B of FIG. 4.

The cover flap 20 is pivotably movable about the hinge axis 22 between the closed position of FIG. 1, a half open position standing upright from the hinge axis 22 at ninety degrees to the plane of the fixed wall 18, as shown in FIGS. 2 and 3, and a fully open position folded back over the fixed wall 18 in overlying relation to both the fixed wall 18 and the port 16 therein, as shown in FIGS. 4 and 5. As described in more detail below, the cover flap 20 and the outer mounting rim 12 have cooperating securement features thereon to enable securement of the cover flap 20 in place in both the closed position of FIG. 1 and the fully open position of FIGS. 4 and 5. At various partially open positions therebetween, including the half open position of FIGS. 2 and 3, the cover is unsecured, i.e. freely movable about its hinge axis 22.

As best shown in FIG. 5, in addition to the fixed wall 18 and the movable cover flap 20, the circular inner area 20 is also occupied by a perforated straining member 24 that resides in a plane situated parallel to, and just below, the plane of the fixed wall 18, but is situated in the other semi-circular half of the inner area 14 so as to underlie the cover flap 20 when in the closed position. The straining member 24 is semi-circular in shape and fully occupies this half of the inner area 14. The straining member 24 is perforated over a substantial majority of its semi-circular area, though not quite an entirety thereof, a remainder of which instead features an unperforated margin space 26 spanning a full perimeter of the screen member around the perforated central area thereof. In the illustrated example, the overall shape of the perforated area of the screen member is a circular segment, whereby the margin space is constituted by an arcuate strip 26A of uniform width spanning the arcuate boundary of this circular segment just inside a respective arcuate span of the outer mounting rim 12, and a linear strip 26B of uniform width spanning the linear boundary of the circular segment in parallel and adjacent relation to the diametric hinge axis 22.

Referring to FIG. 2, a sealing membrane 28 of sufficient size to fully cover the perforated area of the straining member 24 is provided, and initially resides atop the straining member 24 to fully cover all of the perforations therein in air-tight fashion, thereby preventing air exchange between interior of the paint container on which the lid 10 is installed and the surrounding environment, and thus maintaining the freshness of the paint stored within the container. In the solid line illustration seen in FIGS. 2 to 4, this membrane 28 is a single-use, peel-off, disposable membrane in the form of a thin sheet or film bonded to the top surface of the straining member 24, at least at the outer margin space 26 thereof surrounding the perforated area. For optimal retention of the membrane 28 in sealed relationship over the perforations of the straining member, the membrane 28 may be bonded to the straining member over an entirety of its perforated area, and not just at the unperforated outer margin 26.

A paint container with the lid 10 thereon is delivered or given to a customer with the peel-off membrane 28 initially bonded in place to ensure the paint is stored in air-tight fashion until time of first use, whereupon the cover flap 20 is at least partially opened, and the membrane 28 is peeled off to expose the perforated straining member 24, as shown in FIGS. 4 and 5. While the peel-off membrane 28 is shown as an opaque sheet in the figures for illustrative clarity, it may optionally be comprised of transparent or translucent film. If not done prior to removal of the membrane, the cover flap is opened further into, secured in, the fully open position of FIGS. 4 and 5, before then pouring paint from the container through the perforations of the straining member 24, thereby straining the paint as it is poured.

The mounting rim 12 has a top wall 30, an outer wall 32 depending downward from the top wall 30 an outer edge thereof, and an opposing inner wall 34 depending downward from the top wall 30 an inner edge thereof, whereby the mounting rim 12 is of a downwardly opening channel-shaped configuration for mating over the top rim of a paint container around the circular top opening of such container. The circular inner area 14 of the lid 10 is thereby placed in overlying relation to the paint container's circular top opening when the lid is installed, whereby paint is pourable through the perforated straining member 24 revealed by the opened cover flap 20 at the respective semi-circular half of the lid's inner area 14. The solid wall 18 of the lid 10 is affixed to the inner wall 34 of the mounting rim at an elevation thereon downwardly offset from the top wall 30 of the mounting rim, whereby the solid wall 18, the hinge axis 22, and the cover flap 20, when closed, all resides at a recessed elevation relative to the uppermost surface of the mounting rim 12 (i.e. the topside 30A of the mounting rim's top wall 30).

The cover flap 20 has a lock tab 36 that stands upright from a topside of the cover flap 20 in the closed position thereof at a central point along the arcuate perimeter edge of the cover flap's semi-cylindrical shape. The lock tab 36 has a female securement slot 38 lying crosswise of the tab 36 at an intermediate elevation. A pair of corresponding lock tab recesses 40A, 40B are provided in the inner wall 34 of the mounting rim 12 at diametrically opposing positions across the circular inner area 14 of the lid 10. The first lock tab recess 40A resides at a midpoint of the arcuate boundary of the semi-circular half of the inner area 14 that is occupied by the straining member 24, and also occupied by the closed position of the cover flap 20. The second lock tab recess 40B resides at a midpoint of the arcuate boundary of the semi-circular half of the inner area 14 that is occupied by the fixed wall 18. In the closed position of the cover flap 20, the lock tab 36 is received in the first lock tab recess 40A. In the fully open position of the cover flap 20, the lock tab 36 is received in the second lock tab recess 40B.

Each lock tab recess 40A, 40B has a male securement rib 42 running across the circumferentially oriented wall of the recess (i.e. the wall thereof facing the central axis 19, as opposed to the radial side walls of the recess that lie radially of the central axis 19). In the closed position of the cover flap 20, the male securement rib 42 of the first lock tab recess 40A is received in snap-fit engagement within the female securement slot 38 of the lock tab 36, thereby frictionally securing the lock tab 36 in the first lock tab recess 40A, and thereby locking the cover flap 20 in the closed position. Likewise, In the fully open position of the cover flap 20, the male securement rib 42 of the second lock tab recess 40B is received in snap-fit engagement within the female securement slot 38 of the lock tab 36, thereby frictionally securing the lock tab 36 in the second lock tab recess 40B, and thereby locking the cover flap 20 in the fully open position. This way, a user need not manually hold the cover flap 20 open while pouring paint through the perforations of the revealed straining member 24. While the illustrated example has the male securement feature (securement rib 42) on the mounting rim 12 and the female securement feature (securement slot 38) on the lock tab 36 of the cover flap 20, the relative positions of the male/female snap-fit securement features may be reversed.

In the closed position of the cover flap 20, the top end 36A of the lock tab 36 resides flush with the topside 30A of the mounting rim's top wall 30. This way, the lock tab 36 doesn't project upwardly beyond this uppermost surface 30A of the mounting rim 12, and thus does not interfere with proper fitment of a paint shaker lid clamp against the mounting rim 12 of the lid 10 when the lidded paint container is placed into a mechanical paint shaker. At the same time, the flush, rather than recessed, elevation of top end 36A of the lock tab 36 relative to the topside 30A of the mounting rim's top wall 30 means that the lid clamp of the paint shaker will abut the top end 36A of the lock tab 36, thereby exerting downforce on the closed cover flap 20 to help keep the cover flap 20 closed during a paint shaking operation performed by the mechanical paint shaker, thereby preventing paint spillage.

In furtherance of such held closure of the cover flap 20 by a paint shaker lid clamp, the cover flap 20 of the illustrated first embodiment includes two additional closure tabs 44A, 44B likewise standing upright from the topside of the cover flap 20 at the arcuate boundary edge thereof at equally spaced distances from, and on opposite sides of, the lock tab 36. The first lock tab recess 40A in the inner wall of the mounting rim 12 at the strainer-containing half of the lid's inner area 14 is likewise neighboured symmetrically by a pair of closure tab recesses 46A, 46B that accommodate the two closure tabs 44A, 44B in the closed position of the cover flap 20. The top end 44A of each closure tab 44A, 44B resides flush with the uppermost surface 30A of the mounting rim 12 when received in the respective cover flap recess 46A, 46B, whereby these closure tabs 44A, 44B are also held down by the paint shaker lid clamp, thereby better ensuring fully held retention of the cover flap's closed position during a paint shaking operation. The second lock tab recess 40B in the inner wall of the mounting rim at the solid-walled half of the lid's inner area 14 is likewise neighboured symmetrically by a pair of closure tab recesses 48A, 48B that accommodate the two closure tabs 44a, 44b in the fully open position of the cover flap 20.

As mentioned above, though inclusion of the port 16 in a conventional pain bucket lid is to accommodate a pour spot, in the present invention, this port 16, if included, instead can serve one or more other purpose. The port 16 is readily distinguishable from the small perforations of the straining area, in terms of either one or both of its separate and distinct placement away from the straining area at the neighbouring solid area denoted by wall 18, and its distinctly greater size than the comparably small perforations of the straining area 24.

As one non-limiting example, port 16 can serve as an aeration port that can be selectively opened and closed, for example by a pop-out valve (not shown) installed in the port that can be manipulated between a popped-out open position allowing air passage therethrough and an un-popped closed position preventing air passage therethrough, or by a removable cap that can be selectively removed to open up the aeration port, and then reinstalled to reclose the aeration port. By opening this aeration port 16 before pouring the paint through the strainer 24 part of the lid 10, some air will be able to enter the paint container via the opened aeration port 16 to help prevent uneven "glugging" of the paint during the pouring process. Though the aeration port 16 is overlaid by the cover flap 20 in the fully opened and secured position thereof, it will be appreciated that the cover flap 20 doesn't form a full seal with the surrounding mounting rim 12 in this position, and so airflow to the aeration port 16 is not entirely obstructed. That being said, the optional aeration port 16 may be omitted in other embodiments, and/or securement of the cover flap in a fully open position overlying the aeration port may be omitted or left to the user's discretion, for example with reliance being made on holding of the cover flap in a more intermediate open position of less obstructive relation to the aeration port 16.

Another useful purpose of the port 16 is to enable tinting of a base paint inside the paint container 100 with the lid 10 in place, without requiring removal of the sealing membrane 28 from the straining member 24. This way, a tinted paint product required by a customer can be tinted by a retailer or other paint preparer through the tinting port 16 without requiring opening of the movable cover flap 20 or removal of the membrane 28, such that the resulting tinted paint product inside the paint container 100 can be given or delivered to the customer with the membrane 28 intact in its airtight sealing relationship over the perforations of the straining member 24. This best ensures optimal integrity of the paint up to the intended first time of use, as the perforations are sealed closed up until final customer/user removal of the membrane at such time of first use. This prevents drying out of the paint, and potential plugging of the small perforations of the straining member by such dried paint. So not only is the paint integrity optimally retained by prevented air exposure, but the integrity of the straining member is also optimally retained by preventing unwanted plugging of its perforations.

So, a paint manufacturer or distributor can deliver paint containers of untinted base paint to retailers with the inventive lids 10 installed on such containers, with the membrane 28 bonded in place to the perforated straining member 24. When it comes time to tint the base paint, for example in response to the paint color need of a particular customer, the retailer opens the tinting port 16, but leaves the cover flap 20 closed over the intact membrane 28 and underlying straining member 24. Through the open tinting port 16, the retailer introduces a tinting additive into the paint container, thereby adding such tinting agent to the original untinted base paint already inside the container. The retailer then recloses the tinting port 16, and with the movable cover and the openable/closeable port both still remaining closed, places the paint container in a paint shaker for agitated and thorough mixing of the base paint and tinting agent inside the paint container, all while maintaining the perforations under the airtight seal of the membrane. The resulting tinted paint product can then be given or delivered to the customer with the intact membrane 28 still in place until customer/user dispensing of the paint at the desired time of first use.

Figure 8:
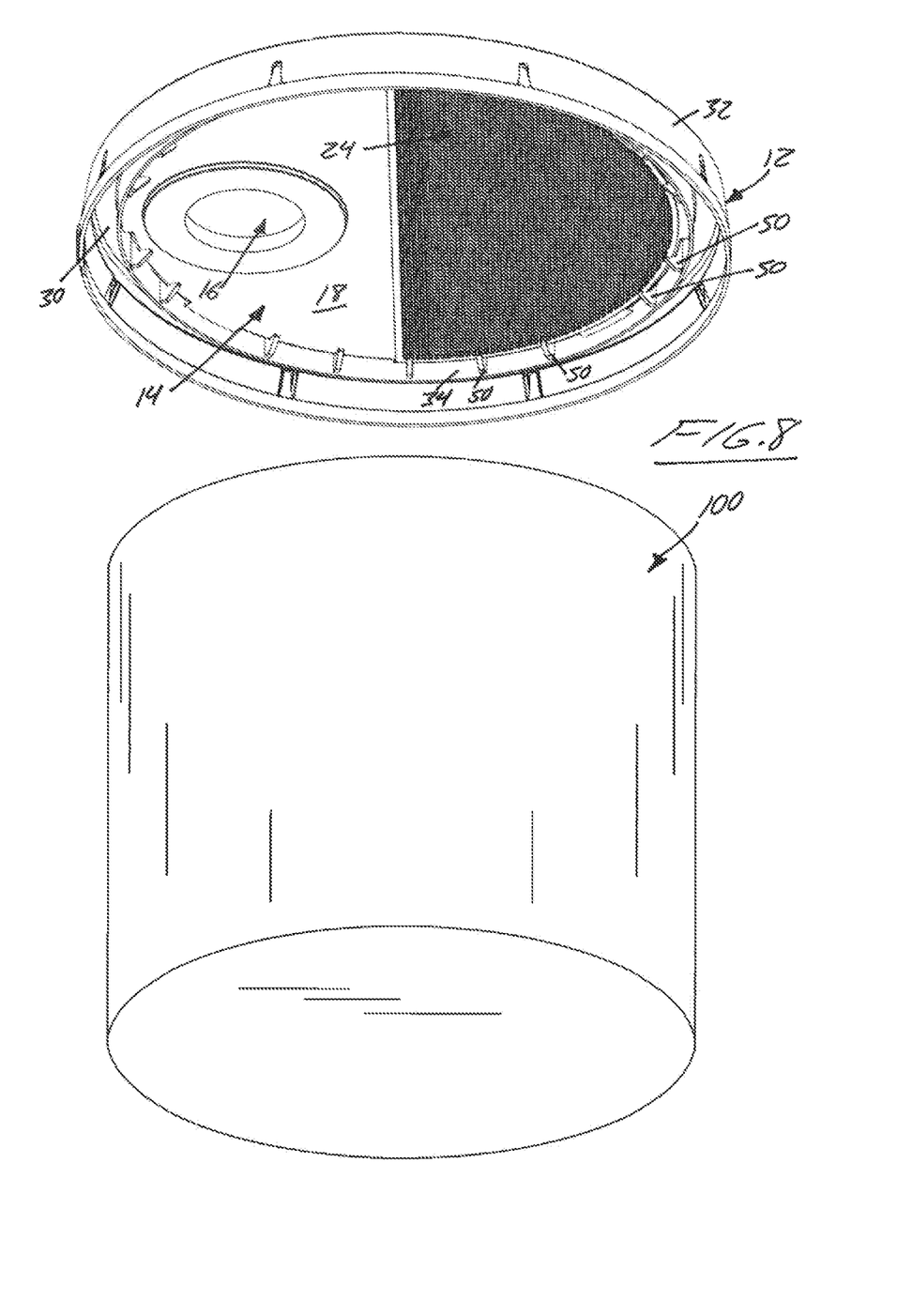
FIG. 8 is a bottom perspective view of the first embodiment in an exploded position relative to a paint container atop which the lid and strainer is installable for use.
Figure 9:
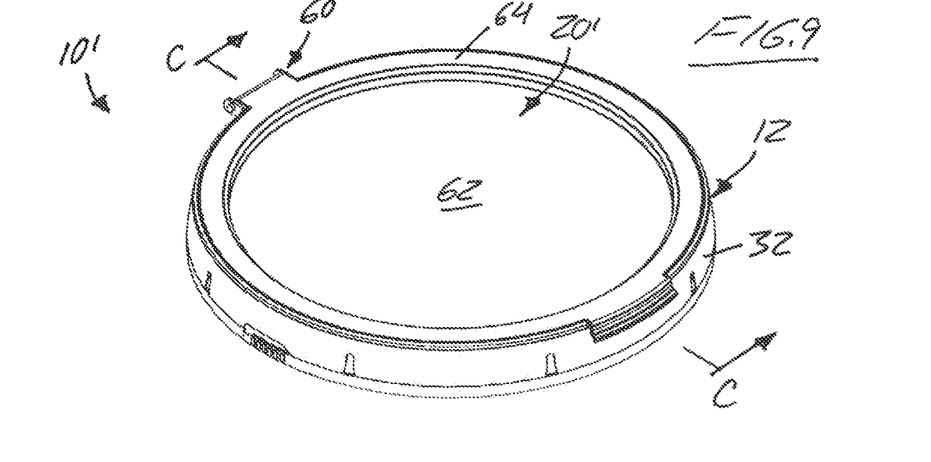
FIG. 9 is a top perspective view of a second embodiment of the combined lid and strainer, which features an externally hinged full cover instead of an integrally hinged partial cover flap.
Figure 10:
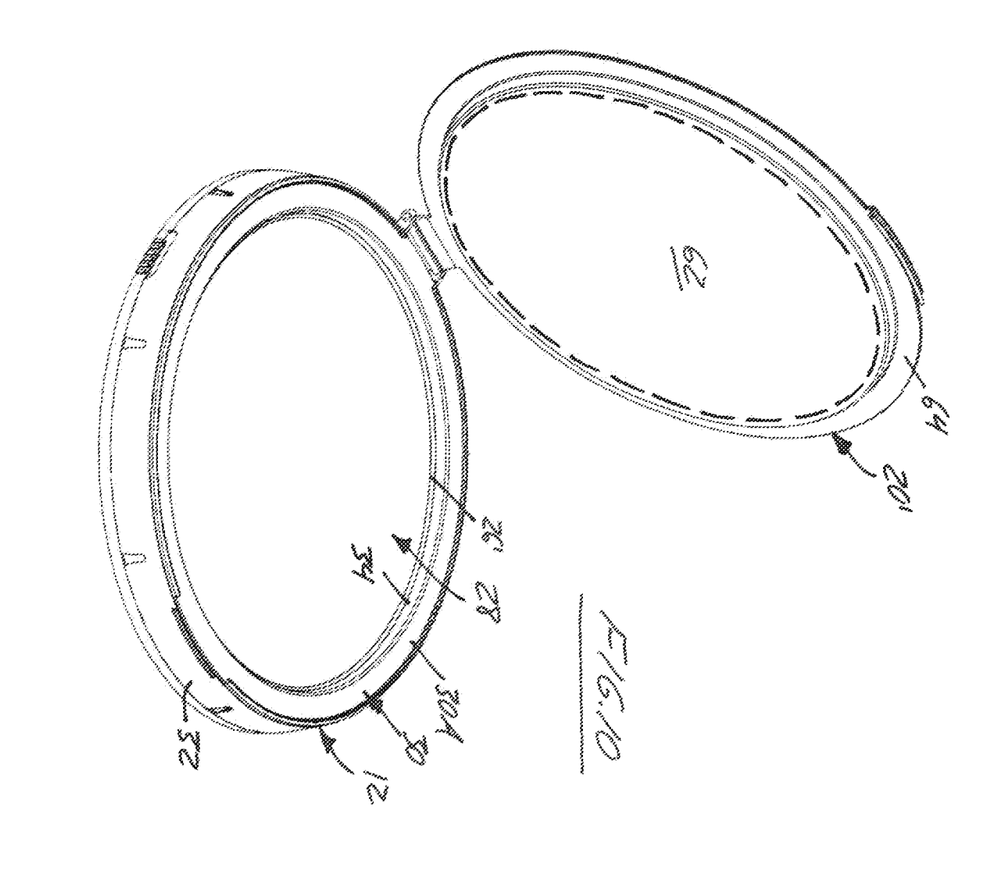
FIG. 10 is a top perspective view of the second embodiment with the full cover thereof in an open position with the peel-off sealing membrane in its initial working position.
Figure 11:
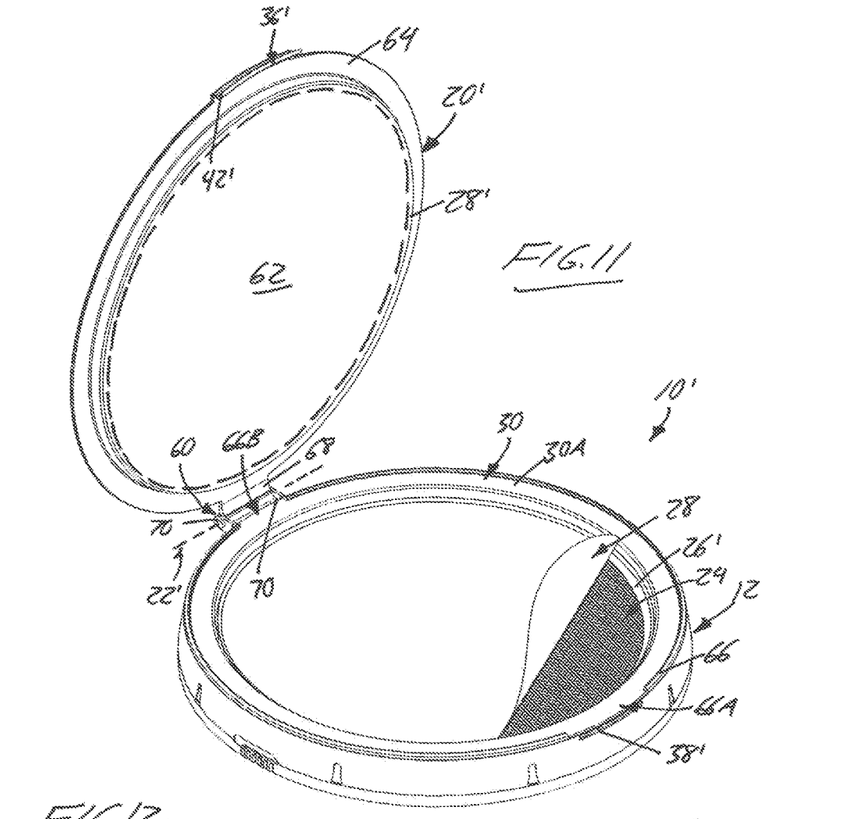
FIG. 11 is another top perspective view of the second embodiment with the full cover thereof in the same position as FIG. 10, but illustrating peeled removal of the peel-off sealing membrane.

FIG. 8 both schematically illustrates placement of the lid 10 onto the top rim of an open-topped paint container 100, and shows the underside of the lid 10, where the straining member 24 can be seen held in place below the plane of the fixed solid wall 18 by a series of gusset-like braces 50 protruding inwardly from the inner wall 34 of the mounting rim 12 at spaced intervals therealong. The braces 50 specifically underlying and holding the straining member 24 may be a subset of a larger overall quantity of braces 50 distributed at spaced intervals around the entirety of the lid's central circular area, as can be seen in the illustrated example where another subset of the braces 50 instead reside beneath the solid wall 18 to reinforce the strength thereof. This gusseted/braced reinforcement of the lid's central area helps ensure sufficient loading capability to handle stacked receipt of at least one other full paint container atop the lid 10.

While the illustrated first embodiment uses an integral cover flap 20 whose supported end is joined to the fixed solid-walled half of the lid's inner area by an integral living hinge, and features a separate straining member 24 coupled to the lid structure beneath the shared plane of the solid wall and closed cover flap, it will be appreciated that in other embodiments, the cover flap 20 may be a separate component of non-integral relation to the solid wall 18, and mechanically coupled thereto in hinged fashion, in which case the strainer perforations may be integrally provided in a perforated half of the same wall 18 that is solid at the other semicircular half thereof. In other embodiments, the cover may be a removable, rather than hinged, component, that clips into a securely closed position of snap fitted engagement with the rim somewhere thereon, and is detached from the rim entirely in its open position.

It will also be appreciated that while the strainer 24 occupies a substantially full half of the lid's inner area 14 in the illustrated first embodiment, and is perforated over a near entirety of this semicircular half area, and the cover flap accordingly also occupies a substantial full half of the lid's inner area when closed, this need not be the case, and the size and shape of the perforated area and associated cover flap may vary. Also, while the illustrated embodiment features solid line illustration of a disposable thin peel-off membrane 28 that is pre-bonded in place atop the perforated strainer area, a reusable sealing membrane in the form of a resiliently compressible gasket may alternatively be used, whether removed and replaced with each use and held in place by locked closure of the cover flap 20, or affixed to the underside of the cover flap for opening and closing movement therewith. Such optional affixation of the membrane to the underside of the cover flap in shown in broken lines at 28' in FIGS. 2, 4 and 5.

FIGS. 9 to 13 show an alternate second embodiment, where rather than a semi-circular cover flap 20 that occupies half of the circular inner area 14 of the lid in the closed position, and is pivotally supported by a living hinge that resides internally within the bounds of the mounting rim 12, the lid 10' of the second embodiment instead features a full-sized circular cover 20' pivotally supported on the mounting rim 12 by an external mechanical hinge 60 supported on the outer wall 32 of the mounting rim 12 outside the circular inner area 14 of the lid. In this embodiment, the perforations of the strainer 24' may occupy a circular, rather than semi-circular, area spanning a substantial entirety of the circular inner area 14 bound by the mounting rim 12 thought again, the strainer 24' preferably includes an intact unperforated margin space 26' spanning around the strainer's perforated area to enable optional bonding of a peel-off sealing membrane 28 suitably sized and shaped to fully cover all perforations of the strainer 24' in air-tight sealing relation thereto, as already described above for the first embodiment. Once again, broken line illustrate alternative placement of reusable gasket like sealing membrane 28' permanently bonded to an underside of the cover 20'. Once again, the strainer 24' may be an integral part of a singular unitary structure (e.g. molded plastic body) that also embodies the mounting rim 12, or may be a separate straining member affixed thereto or supported thereon in any suitable fashion.

The full-size cover 20' of the second embodiment 10' is of oversized relation to the inner circular area 14, and has a circular inner region 62 sized to substantially fill the circular inner area 14 of the lid 10', and thereby fully cover the perforated strainer 24, and a raised outer rim 64 of annular form spanning around the circular inner region 62 in raised elevation therefrom so as to rest atop the top wall 30 of the mounting rim 12 in the closed position of the cover 20'. In this embodiment, it is this raised outer rim 64 that gets clamped by a lid clamp of a paint shaker when placed therein for shaking of the paint container 100, whereby this clamping of the cover's raised outer rim 64 holds the cover's inner region 62 securely closed over the strainer 24 to ensure no leakage during the paint shaking operation. The locking tab 36' in the second embodiment 10' is affixed to the cover's outer rim 64 at the outer perimeter thereof, and hangs downward from the plane of the outer rim 64 in the cover's closed position, rather than standing upward form the plane of the cover like in the first embodiment. The locking tab 36' has a male securement rib 42' thereon on an inner side thereof that faces inwardly toward the center of the cover 20', and a mating female securement slot 38' is provided in the outer wall 34 of the mounting rim 12 to receive the male securement rib 42' in the closed position of the cover 20'.

Figures 12, 13:
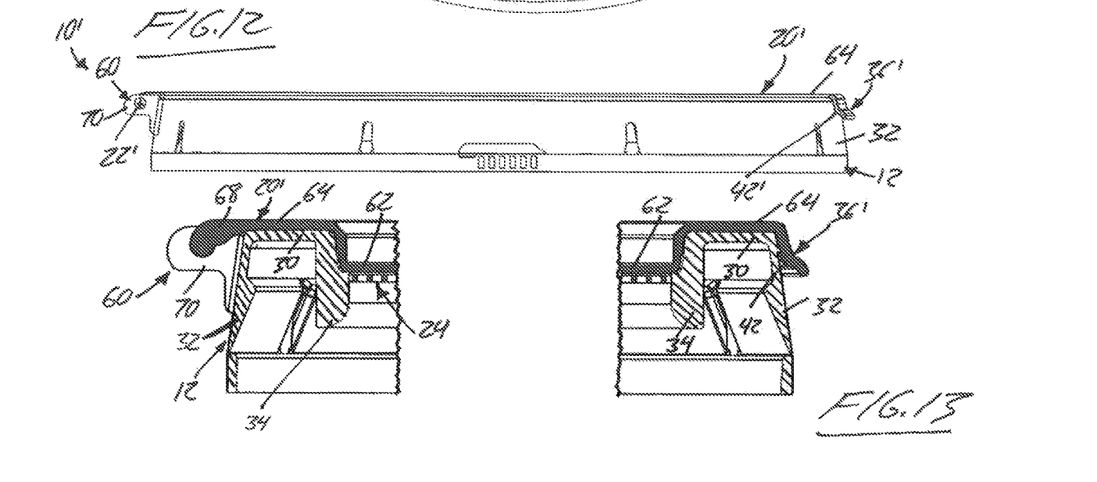
FIG. 12 is a side elevational view of the second embodiment.
FIG. 13 is a cross-sectional view of the second embodiment, as viewed along line C-C of FIG. 9.

In the illustrated example, the mounting rim 12 features a slightly raised perimeter rib 66 at the intersection of the top and outer walls 30, 32 of the mounting rim 12. This perimeter rib 66 spans a near entirety of the mounting rim's annular shape, with the only breaks being a lock tab gap 66A aligned with the female securement slot 38' to accommodate the locking tab 36' in the closed position of the cover 20', and a hinge gap 66B accommodating a hinge arm 68 of the cover 20' that juts a short distance radially outward from the cover's raised outer rim 64 between a pair of hinge lugs 70 that jut radially outward from the outer wall 32 of the mounting rim 12. These hinge lugs 70 pivotably receive the hinge arm 68 of the cover 20' between them, and form the working mechanical hinge 60 therewith to pivotally support the cover 20' on the mounting rim 12. As best shown in FIG. 12, the hinge axis 22' of the externally located mechanical hinge 60 resides at an elevation slightly lesser than those of both the topside 30A of the mounting rim 12 and the raised outer rim 64 of the closed cover 20'. Likewise, no part of either hinge lug 70, nor any part of the hinge arm 68 in the cover's closed position, resides above the plane of the raised outer rim 64 of the closed cover 20'. As a result, no part of the hinge 60 projects upwardly beyond either the uppermost plane of the closed cover (topside of raised rim 64), or the uppermost plane (top wall topside 30A) of the mounting rim 12. Accordingly, the hinge 60 does not to interfere with placement a lid clamp of a paint shaker against the raised outer rim 64 of the cover 20' during working placement of the paint container into a mechanical paint shaker.

Since various modifications can be made in my invention as herein above described, and many apparently widely different embodiments of same made, it is intended that all matter contained in the accompanying specification shall be interpreted as illustrative only and not in a limiting sense.

The invention claimed is:

1. A lid and strainer device for a paint container, comprising:
    an outer mounting rim of downwardly-opening channel-shaped configuration for mated fitting over a top rim of the paint container, said outer mounting rim spanning around a central circular area;
    within said central circular area surrounded by the rim:
        a wall occupying a plane that lies normal to a central axis around which the outer mounting rim in centered and resides in recessed elevation to a topside of the outer mounting rim; and
        a straining area having perforations therein that penetrate fully through said straining area from a topside thereof to an opposing underside thereof to enabling strained pouring of paint from the paint through said perforations;
    a movable cover selectively movable between a closed position overlying the straining area at the topside thereof in fully obstructing relation to the perforations, and at least one open position withdrawn from the topside of the straining area to expose the perforations therein and allow said strained pouring of the paint therethrough;
    a support arrangement projecting inwardly from the mounting rim into the central circular area beneath said wall and said straining area in supportive relation thereto at undersides thereof to impart increased load bearing capacity thereto to accommodate stacking of a second paint container atop the lid and strainer device.

2. The device of claim 1 further comprising a membrane spanning an entirety of the straining area in a position of overlying relation thereto and underlying relation to the closed position of the cover, said membrane providing an airtight seal over the perforations to prevent drying of paint contents of the paint container.

3. The device of claim 2 wherein said membrane is bonded in place over an entirety of the straining area for optimal retention of said airtight seal.

4. The device of claim 1 further comprising a membrane attached to an underside of the movable cover for movement therewith in a position of fully overlying relation to the straining area in the closed position of the movable cover to provide an airtight seal over the perforations and thereby prevent drying of paint contents of the paint container.

5. The device of claim 1 wherein said support arrangement comprises a series of braces projecting inwardly from the mounting rim at spaced intervals around the central circular area.

6. A lid and strainer device for a paint container, comprising:
    an outer mounting rim of downwardly-opening channel-shaped configuration for mated fitting over a top rim of the paint container, said outer mounting rim spanning around a central circular area;
    within said central circular area surrounded by the rim:
        a wall occupying a plane that lies normal to a central axis around which the outer mounting rim in centered and resides in recessed elevation to a topside of the outer mounting rim;
        a straining area having perforations therein that penetrate fully through said straining area from a topside thereof to an opposing underside thereof to enabling strained pouring of paint from the paint through said perforations; and
        a tinting port in said wall that is of greater size than said perforations of the straining area; and
    a movable cover selectively movable between a closed position overlying the straining area at the topside thereof in fully obstructing relation to the perforations, and at least one open position withdrawn from the topside of the straining area to expose the perforations therein and allow said strained pouring of the paint therethrough.

* * * * *